April 28, 1931.  H. WHITE  1,802,993
PIPE TURNING DEVICE
Filed Dec. 5, 1930
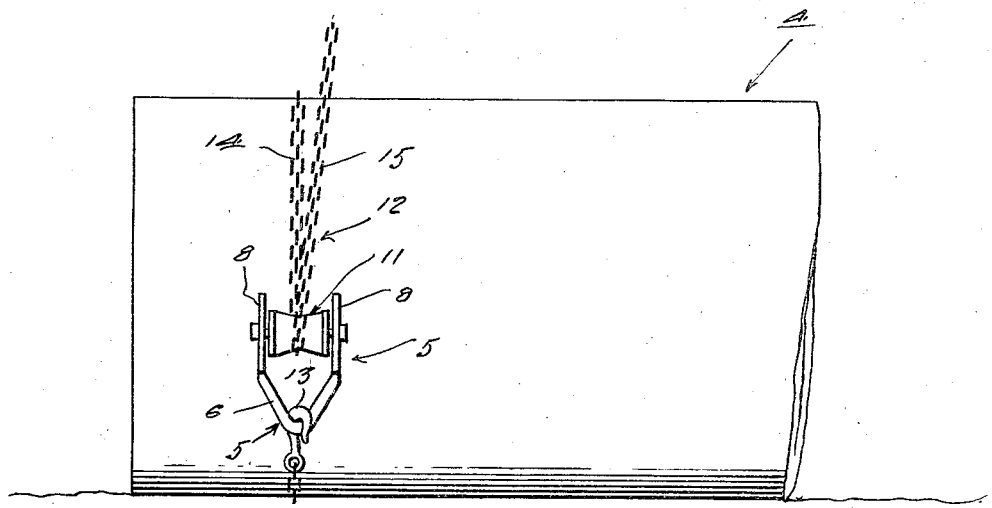
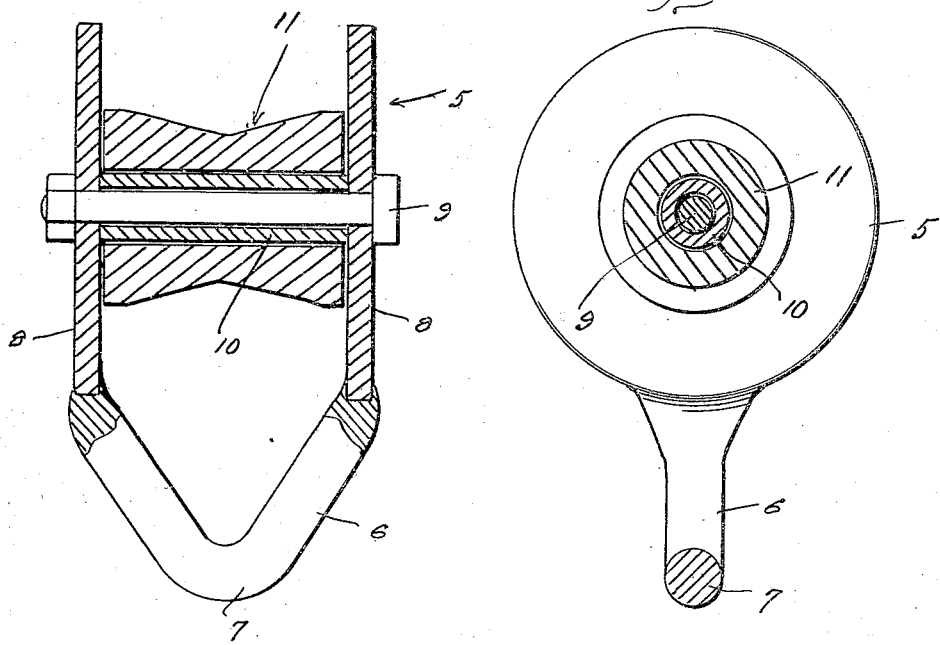
Inventor
Henry White
By Clarence A. O'Brien
Attorney Patented Apr. 28, 1931

1,802,993

UNITED STATES PATENT OFFICE

HENRY WHITE, OF WAYNESBURG, PENNSYLVANIA

PIPE-TURNING DEVICE

Application filed December 5, 1930. Serial No. 500,379.

This invention relates to an improved mechanical device for embracing and turning objects such as large pipes, logs, and the like.

Briefly stated, the inventive conception comprehends the use of a structure characterized by two primary parts, namely, an element to embrace the object to be grasped and turned, and an anti-friction pulley appliance associated therewith.

In carrying the inventive conception into practice, I have developed a simple and expedient contrivance which is specifically characterized by an ordinary teamster's chain having hooks at the opposite ends, and a pulley-equipped guide over which the chain is trained in such a manner as to permit a desirable gripping action sufficient to permit the object to be bodily turned.

Other features and advantages will become more readily apparent from the following description and drawings. In the drawings:

Figure 1 is a side elevational view of a fragmentary portion of a heavy pipe showing the appliance wrapped thereabout in operative position.

Figure 2 is a view in section and elevation of the pulley equipped guide.

Figure 3 is a sectional view through the structure shown in Figure 2.

In the drawings, in Figure 2, the reference character 4 designates the work or object to be grasped and turned bodily. This is here shown in the form of a heavy pipe. One part of the device for turning the object 4 is in the nature of an anti-friction guide which is generally denoted by the numeral 5. By preference, this comprises a yoke including a V-shaped part 6 the crotch portion 7 of which constitutes a keeper seat.

Connected with the converging ends of the arms of the yoke are spaced, parallel discs 8. These are provided with alined bolt holes to accommodate the bolt 9. Surrounding this bolt and confined between the discs is a spacing sleeve 10 which functions as a hub for the pulley 11. The pulley is preferably concaved at its center as shown. Incidentally, the pulley is of a length less than the space between the discs 8. In other words, the sleeve 10 is made sufficiently long to space the ends of the pulley from the discs to facilitate rotation. The next part of the device is in the form of a pipe embracing element.

By preference, this comprises an ordinary teamster's chain, generally designated by the numeral 12. Incidentally a rope or cable might be used for this purpose but a rope is generally susceptible of ready wear and deterioration and is objectionable because of the elastic properties thereof. A chain has been found to be the most practical type of encircling element for the purpose.

The hook 13 on one end of the chain is merely engaged in the crotch 7 of the yoke and the end portion 14 of the chain is brought beneath, around and over the pipe 4 and the terminal portion 15 of the chain is trained around the pulley 11 and carried upwardly and beyond the pipe, the hook (not shown) on the opposite end being connected with a source of power (not shown) to accomplish the bodily turning of the pipe.

In handling the structure, an important factor to be borne in mind is that the pulley equipped guide device 5 should be located at a point below the longitudinal axis of the pipe as illustrated in Figure 1. Obviously, the application of power to the remote end of the chain will cause the chain to grip the pipe. This will tighten the chain sufficiently around the pipe to afford the desired grip. The pull on the chain will rotate the device and pipe in the desired direction as a unit until the guide 5 is elevated to a predetermined point. It is then released and lowered so as to obtain a new hitch, the object being to keep the point of hitch below the center of gravity, or below the longitudinal axis of the pipe so as to make frequent hitchings unnecessary.

In a sense, the gist of the invention is in the provision of a noose preferably in the form of a chain to embrace the pipe wherein said noose embodies a return bend on the chain passed through an anti-friction guide device so as to facilitate turning and reshifting of the guide device in an obvious manner for bodily turning the pipe.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to in actual practice if desired.

I claim:

As a new product of manufacture, a guide for use and association with a double hooked teamster's chain of the class described comprising a yoke including a V-shaped portion whose crotch constitutes a keeper seat for removable reception of one of said hooks, the arm portion of said V-shaped portion being formed with spaced parallel apertured discs, a bolt passing through said apertures, a spacing sleeve surrounding the bolt and located between the disc and constituting a hub, and a concaved pulley mounted on said spacing sleeve between said discs.

In testimony whereof I affix my signature.

HENRY WHITE.